(12) United States Patent
Yun et al.

(10) Patent No.: US 7,499,430 B2
(45) Date of Patent: Mar. 3, 2009

(54) SWITCH FRAME, METHOD OF TRANSMITTING THE SWITCH FRAME AND A QUALITY INDICATOR CHANNEL STRUCTURE INCLUDING THE SWITCH FRAME

(75) Inventors: Young Woo Yun, Seoul (KR); Cheol Woo You, Seoul (KR); Ki Jun Kim, Seoul (KR); Soon Yil Kwon, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 828 days.

(21) Appl. No.: 10/426,684

(22) Filed: May 1, 2003

(65) Prior Publication Data

US 2003/0206541 A1 Nov. 6, 2003

(30) Foreign Application Priority Data

May 3, 2002 (KR) .................. 10-2002-0024359

(51) Int. Cl.
H04Q 7/00 (2006.01)
(52) U.S. Cl. .................. 370/331; 370/336; 370/338; 455/436
(58) Field of Classification Search .................. 370/209, 370/236, 311, 328, 330, 332, 335, 337, 342; 375/135; 455/452.1, 522
See application file for complete search history.

(56) References Cited

U.S. PATENT DOCUMENTS 5,822,313 A 10/1998 Malek et al. .................. 370/332
5,909,434 A * 6/1999 Odenwalder et al. ......... 370/342
6,487,181 B1 * 11/2002 Johnson et al. .............. 370/311
6,539,047 B1 * 3/2003 Moon .......................... 375/135
6,563,806 B1 * 5/2003 Yano et al. ................... 370/330
2001/0019541 A1 * 9/2001 Jou et al. ..................... 370/311
2002/0138721 A1 * 9/2002 Kwon et al. ................. 713/151
2002/0176362 A1 * 11/2002 Yun et al. .................... 370/236

(Continued)

FOREIGN PATENT DOCUMENTS

CN 1633822 6/2005
EP 1 128 572 A1 8/2001

(Continued)

OTHER PUBLICATIONS

Honkasalo, et al. GSM/DCS air interface enhancements for high speed data applications. This Annual International Conference on Universal Personal Communications. Universal Personal Communications, 1994. 1994 Third Annual International Conference on San Deigo, CA Sep. 27 - Oct. 1, 1994, New York, NY, IEEE. p. 480-484.

*Primary Examiner*—Ricky Ngo
*Assistant Examiner*—Kan Yuen
(74) *Attorney, Agent, or Firm*—Lee, Hong, Degerman, Kang & Waimey

(57) ABSTRACT

Disclosed are a switch frame, a method of transmitting the same at a mobile station, and a quality indicator channel structure including the same. The frame for switching a cell/sector has at least one first slot at a beginning portion of the frame, the at least one first slot having a channel quality indicating information, and at least one second slot at an end portion of the frame, the at least one second slot having cell/sector switching information.

51 Claims, 16 Drawing Sheets

U.S. PATENT DOCUMENTS

| | | | |
|---|---|---|---|
| 2003/0050084 A1* | 3/2003 | Damnjanovic et al. | 455/522 |
| 2003/0067899 A9* | 4/2003 | Chen et al. | 370/335 |
| 2003/0129989 A1* | 7/2003 | Gholmieh et al. | 455/452 |
| 2003/0156556 A1* | 8/2003 | Puig-Oses et al. | 370/328 |
| 2003/0169705 A1* | 9/2003 | Knisely et al. | 370/332 |
| 2003/0206541 A1* | 11/2003 | Yun et al. | 370/337 |
| 2004/0013102 A1* | 1/2004 | Fong et al. | 370/345 |
| 2005/0117508 A1* | 6/2005 | Gaal | 370/209 |

FOREIGN PATENT DOCUMENTS

| | | |
|---|---|---|
| JP | 2000-023225 | 1/2000 |
| JP | 2001-298762 | 10/2001 |
| WO | WO 9400927 | 1/1994 |
| WO | WO 99/38275 | 7/1999 |
| WO | WO 01/08324 A1 | 2/2001 |
| WO | WO 03/010984 A1 | 2/2003 |

* cited by examiner

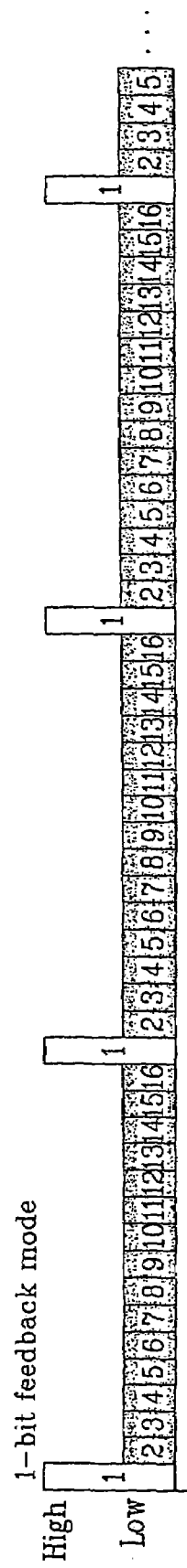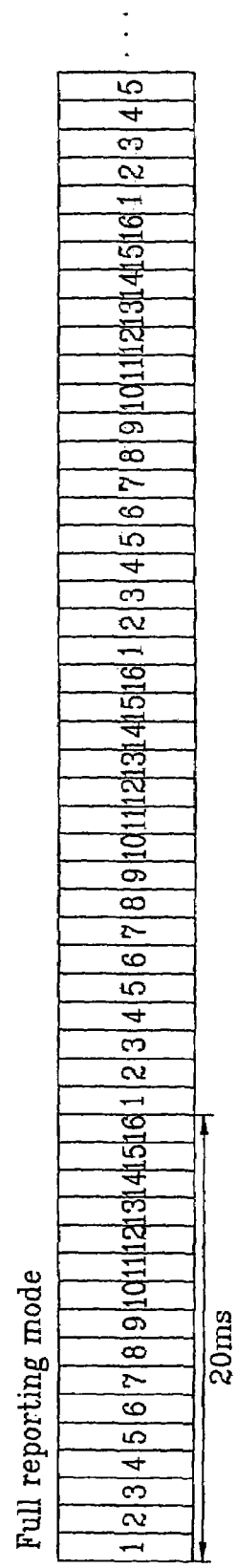
FIG. 1A Related Art
FIG. 1B Related Art

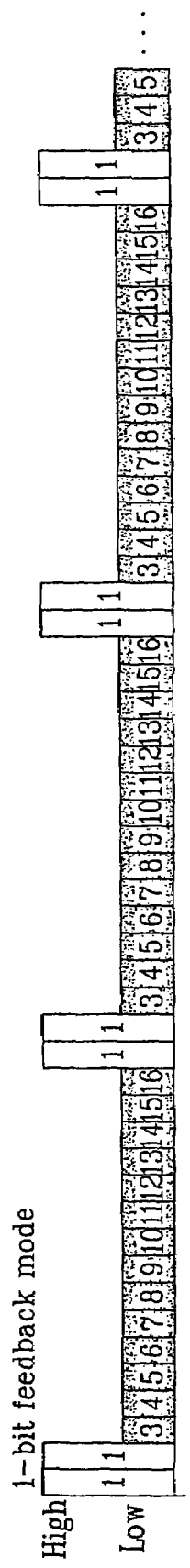
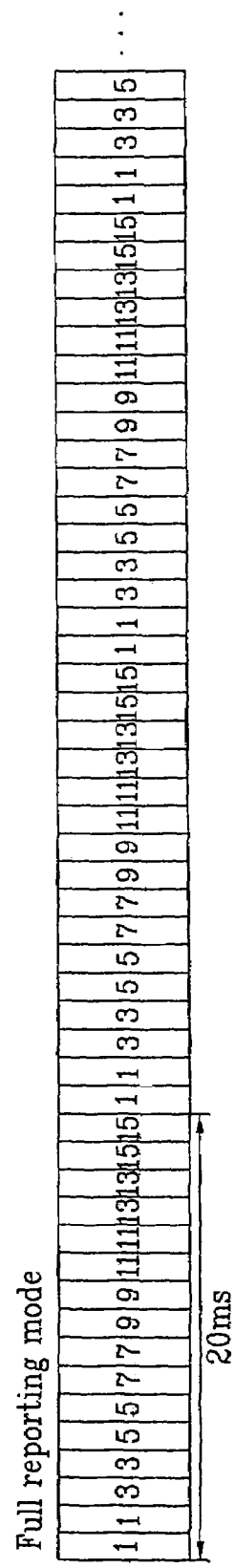
FIG. 2A
Related Art
FIG. 2B
Related Art

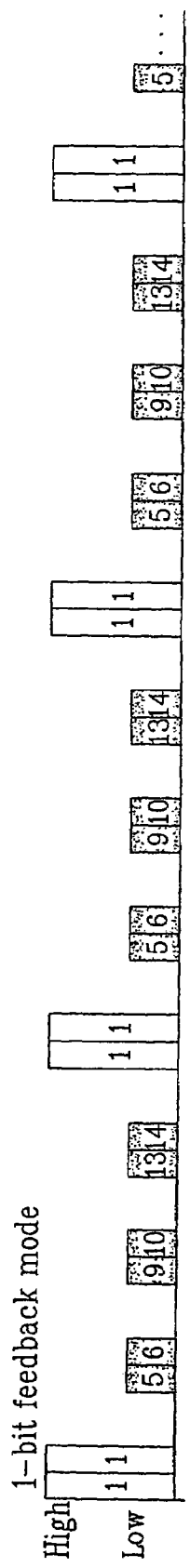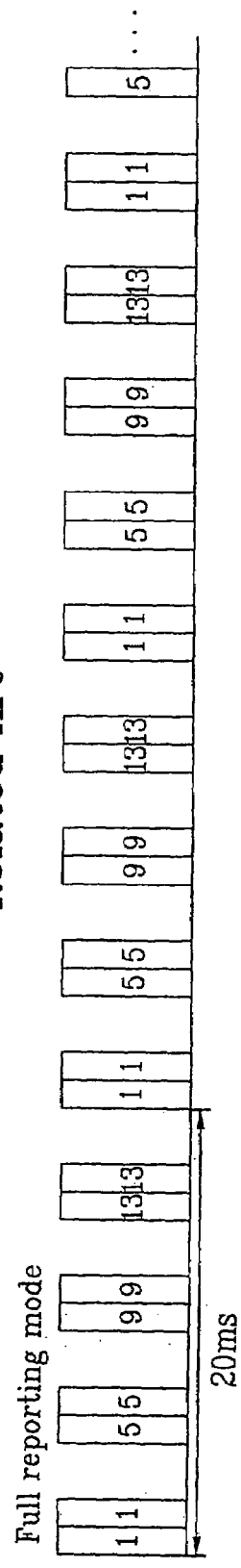

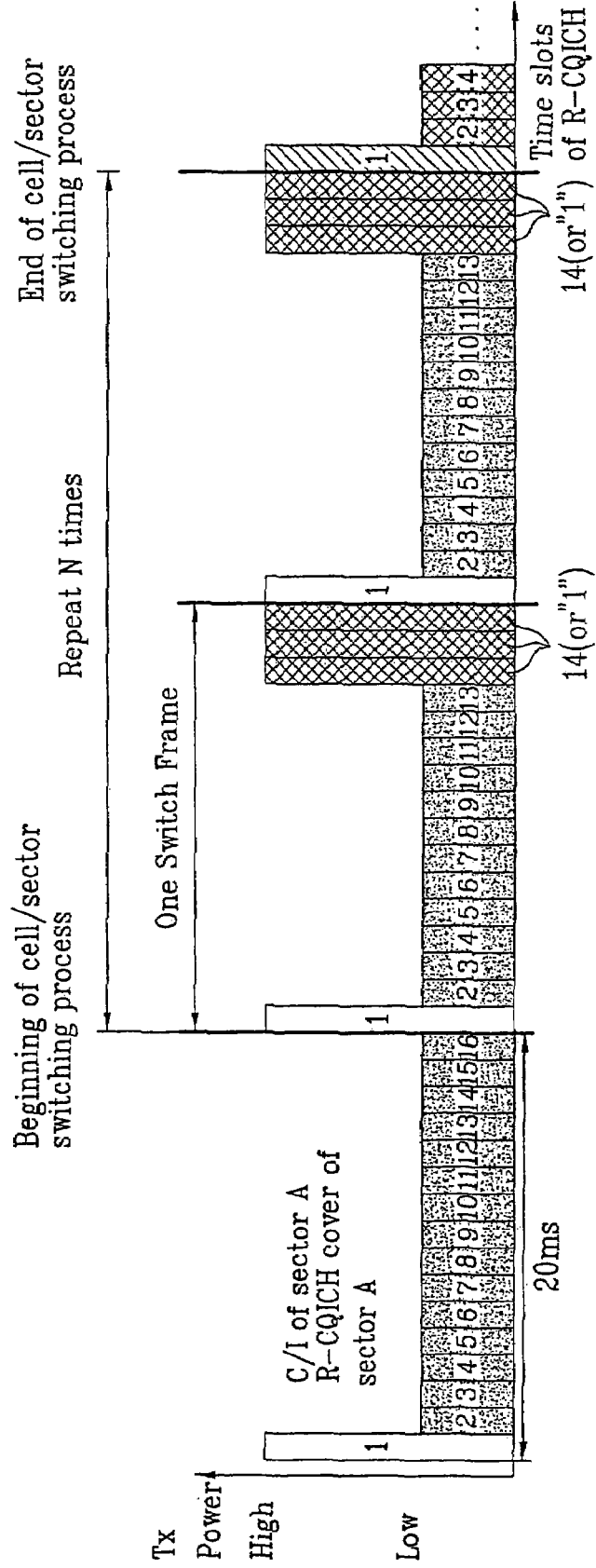

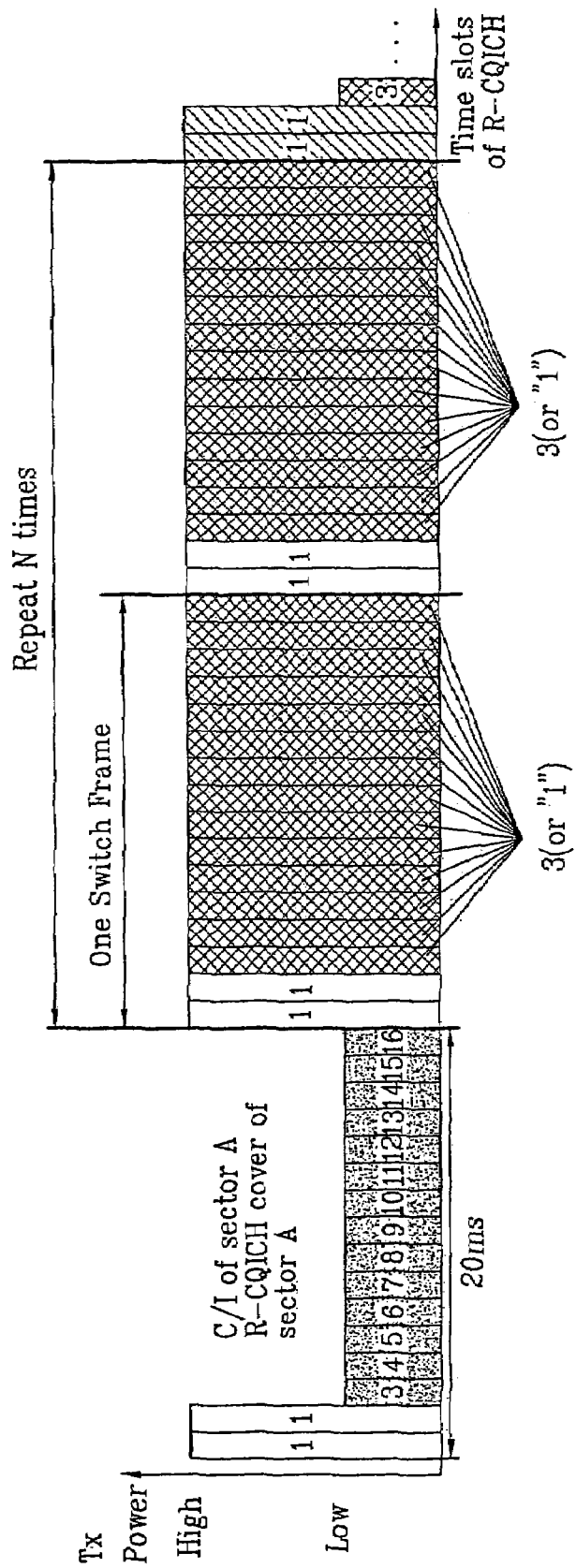

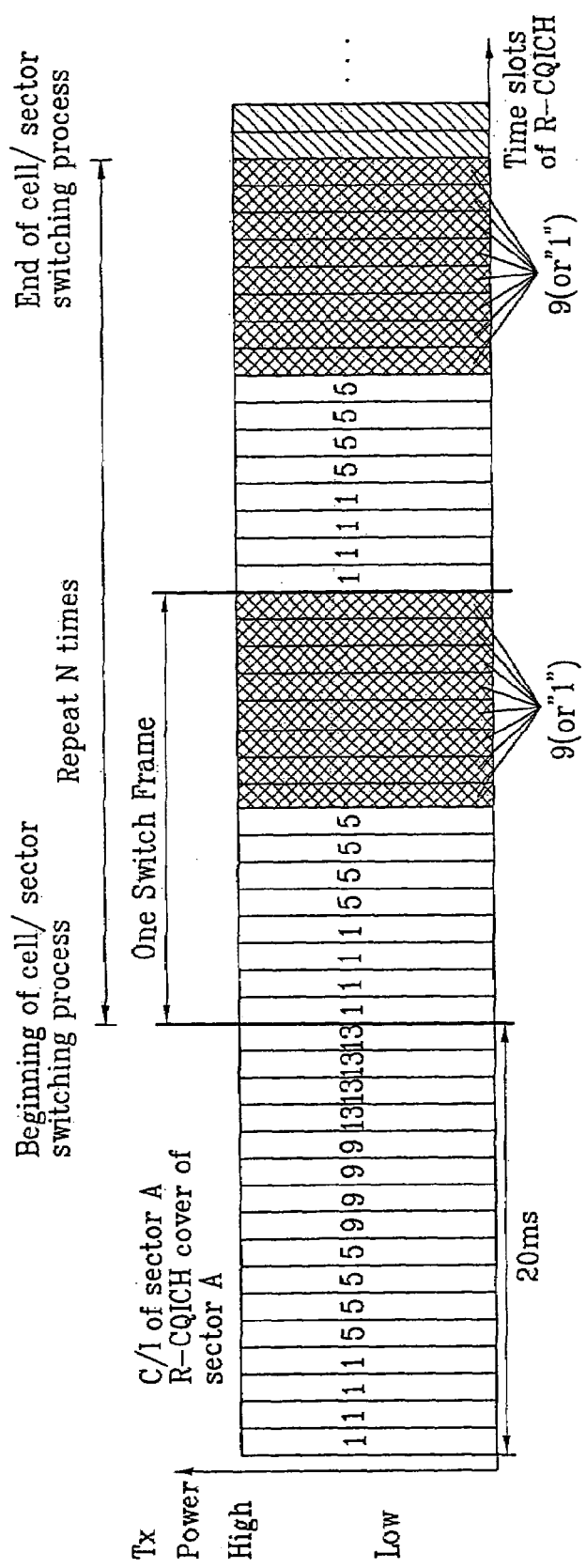

SWITCH FRAME, METHOD OF TRANSMITTING THE SWITCH FRAME AND A QUALITY INDICATOR CHANNEL STRUCTURE INCLUDING THE SWITCH FRAME

This application claims the benefit of the Korean Application No. P2002-24359 filed on May 3, 2002, which is hereby incorporated by reference.

BACKGROUND OF THE INVENTION

1. Field of the Invention

The present invention relates to communications, and more particularly, to a switch frame, a method of transmitting the same at a mobile station, and a quality indicator channel structure including the same.

2. Discussion of the Related Art

In a 1×EV-DV (1× EV-Data & Voice) system, a reverse-channel quality indicator channel (hereinafter referred to as R-CQICH) has been defined in order to support a high-rate packet data channel.

Briefly, the above-described R-CQICH transmission plays two roles. First, the R-CQICH physical channel is used to report channel quality information that is represented as a power ratio of a carrier-to-interference (hereinafter referred to as C/I) signal of a carrier of the best serving cell/sector for every 1.25 ms. Based on this channel information, a corresponding base transceiver subsystem (base station) varies transmission power levels of a packet data channel, and data transmission rates (for example, encoder packet data sizes and transmission slot durations, when to schedule a particular mobile station on the packet data channel, and when to hand-off transmission on the packet data channel from one pilot (e.g., sector or base station (e.g., cell)) to another sector or base station (e.g., cell)).

Second, the CQICH may be used to point the best serving cell/sector among cells/sectors that belong to an active set. That is, since the whole or a portion of the CQICH is transmitted, being covered with a Walsh code of the best cell/sector, the corresponding base station can recognize the best serving cell/sector by decovering the CQICH. This coverage area represents a cell or any one of sectors included in the cell.

In case that no cell/sector switching exists, a transmission protocol of the CQICH is briefly divided into a normal mode and a reduced rate mode. Also, two kinds of transmission modes, that is, a full C/I feedback mode (hereinafter full reporting mode) and a differential C/I (modulation) feedback mode (hereinafter referred to as DM mode) exist with respect to the normal mode and the reduced rate mode, respectively. Further, the full and DM reporting mode are modified by pilot gating (hereinafter as control hold mode).

FIGS. 1A and 1B are diagrams explaining a related art method of transmitting channel information in a normal mode of an active state. FIGS. 2A and 2B are diagrams explaining a related art method of transmitting channel information in a ½ reduced rate mode of an active state. FIGS. 3A and 3B and 4A and 4B show a CQICH transmission mode in the control hold mode.

FIGS. 1A and 1B and FIGS. 2A and 2B are for explaining four kinds of transmission modes in case that no cell/sector switching exists in the transmission protocol of the CQICH, and they show the construction of frames for transmitting channel information (for instance, carrier-to-interference ratio).

The first transmission mode is a DM transmission mode in the normal mode as illustrated in FIG. 1A. In the DM mode of the normal mode, a mobile station quantizes forward full carrier-to-interference (C/I) information of the present serving cell/sector, i.e., the best serving cell/sector measured at a first slot of 1.25 ms for every frame of 20 ms by a predetermined number of bits, applies a [12, 4]-block coding to the quantized full C/I information, and performs a 8-ary Walsh covering with respect to the block-coded C/I information to transmit the Walsh-covered C/I information to at least one base station (BS) in an active set including the BTSs of the best serving cell/sector.

During the 15 remaining slots of 1.25 ms, the mobile station judges whether a C/I quality (e.g., forward link quality) measured at the present slot has been changed to a good quality or a bad quality in comparison to the full C/I information measured at the previous slot, and transmits a quality up/down command (or differential modulation symbol with at least one bit) to the base stations accordingly. This quality up/down command is repeated 15 times, and the 8-ary Walsh covering that corresponds to the best serving cell/sector is applied thereto for its transmission.

The full C/I information and the up/down command can be detected and used only by the base stations that can perform a Walsh decovering of the full C/I information and the up/down command. In the DM mode of the normal mode, which is different from the full reporting mode of the normal mode, the transmission power can be greatly reduced if the number of bits of information to be transmitted for 1.25 ms is one. That is, by using the DM mode of the normal mode, the load of the reverse link can be greatly reduced in comparison to the full reporting mode of the normal mode.

However, the DM mode of the normal mode has the disadvantages that if the corresponding base station cannot detect the full C/I information of the best serving cell/sector received during the first slot period of the 20 ms frame or receives the full C/I information with an error rate of more than a target frame error rate, the base station can suffer an error propagation due to the 15-times DM symbols received after the full C/I information is transmitted. Accordingly, the 4-bit full C/I information, which is transmitted during the first slot period of each 20 ms frame, is transmitted with a sufficient transmission power so that the corresponding base station can accurately receive the information.

The second transmission mode is the full reporting mode in the normal mode as illustrated in FIG. 1B. In the full reporting mode of the normal mode, the mobile station measures the forward full C/I information of the best serving cell/sector for each 1.25 ms, quantizes the measured information by a predetermined number of bits, and applies a [12, 4]-block coding to the quantized information. Then, the mobile station performs a 8-ary Walsh covering of the best serving cell/sector with respect to the block-coded quantized information, and transmits the Walsh-covered information to at least one base station in an active set including the base stations of the best serving cell/sector.

The full C/I information can be detected and used only by the base stations that can perform a Walsh decovering of the full C/I information. In the full reporting mode of the normal mode, the corresponding base station can detect the quality information of the forward link relatively accurately, but it requires a large amount of transmission power. Thus, it has the disadvantages that it occupies a large capacity of the reverse link. As a result, the full reporting mode of the normal mode will be an improper transmission mode in case that many users exist on the reverse link, and thus it can be used only in case that the reverse load is small.

The third transmission mode is a DM transmission mode in the reduced rate mode as illustrated in FIG. 2A. In the DM mode of the reduced rate mode, the basic operation is the same as that of the DM mode of the first normal mode, but it has the following differences. That is, the number of repetition of the 4-bit full C/I information of the best serving cell/sector transmitted on the first slot for each 20 ms is determined according to a predetermined repetition rate.

For instance, if the repetition rate is 2, the same 4-bit full C/I information is transmitted during the period of the first and second slots. Then, all the DM information is transmitted in the same manner as the DM mode of the normal mode during the period of the third to 16th slots. The full C/I information and the quality up/down command can be detected and used only by the base stations that can perform a Walsh decovering of the full C/I information and the quality up/down command. In the DM mode of the reduced rate mode, which is similar to the full reporting mode of the reduced rate mode, the corresponding base station can accurately receive the 4-bit full C/I information even if a link imbalance occurs in the quality of the reverse link and the forward link.

The fourth transmission mode is the full reporting mode in the reduced rate mode as illustrated in FIG. 2B. In the full reporting mode of the reduced rate mode, the 4-bit full C/I information of the best serving cell/sector is transmitted for each slot in the same manner as the full reporting mode of the normal mode. However, the same 4-bit full C/I information is repeatedly transmitted according to a repetition rate that has been prescribed differently from the DM mode of the reduced rate mode.

If the repetition rate is 2, the 4-bit full C/I information transmitted on the first slot is the same as that transmitted on the second slot. In the same manner, the 4-bit full C/I information transmitted on the third slot is the same as that transmitted on the fourth slot. If the repetition rate is 4, the same 4-bit full C/I information is transmitted on the first, second, third and fourth slots, respectively. The full C/I information can be detected and used only by the base stations that can perform a Walsh decovering of the full C/I information.

If the 4-bit full C/I information is repeatedly transmitted in the above-described manner, the probability that the corresponding base station accurately receives the 4-bit full C/I information can be increased. Accordingly, in the full reporting transmission mode in the reduced rate mode, the corresponding base station can receive the 4-bit full C/I information with an error rate below a target error rate, even in case that the link imbalance occurs between the reverse link and the forward link and the quality of the reverse link deteriorates although the quality of the forward link is good.

A mode to be considered in addition to the above-described four transmission modes is a control hold mode as illustrated in FIGS. 3A and 3B and FIGS. 4A and 4B. This mode is for limiting transmission of a pilot channel and transmission of an CQICH by slots in order to prevent waste of power in case that data to be transmitted on the reverse or forward link does not exist.

It is required that the channel quality information and change information (switching information) on the best serving cell/sector on the Channel Quality Indicator Channel (CQICH) varies depending on the above-described transmission modes on the CQICH. Also, a frame structure of the CQICH should be defined so that the base station may efficiently receive and use the channel quality information and the switching information. For example, as the channel quality information should be continuously updated by the base station and the base station also should schedule mobile stations on the CQICH based on the switching information, the base station should receive the channel quality information without an error or a time delay.

SUMMARY OF THE INVENTION

An object of the present invention is to provide a switch frame, a method of transmitting the same at a mobile station, and a reverse quality indicator channel structure including the same that substantially obviate one or more problems due to limitations and disadvantages of the related art.

Another object of the present invention is to provide a switch frame, a method of transmitting the same at a mobile station, and a reverse quality indicator channel structure including the same that enables a smooth performing of an update of a channel quality information.

Still another object of the present invention is to provide a switch frame, a method of transmitting the same at a mobile station, and a reverse quality indicator channel structure including the same that enables a smooth performing of a cell/sector switching.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a frame for switching a cell/sector has at least one first slot at a beginning portion of the frame, the at least one first slot having a channel quality indicating information, and at least one second slot at an end portion of the frame, the at least one second slot having cell/sector switching information.

In another aspect of the present invention, a method of transmitting a switch frame in a cell/sector at a mobile station includes the steps of transmitting channel quality information using at least one slot at a beginning portion of the switch frame, and transmitting cell/sector switching information using at least one slot at an end portion of the switch frame.

In still another aspect of the present invention, a switch frame includes a first portion including channel quality information of a serving cell/sector at a beginning portion of the switch frame, a second portion including cell/sector switching information at an end portion of the switch frame, and a third portion including differential information of the channel quality information between the first portion and the second portion, wherein a length of the third portion depends on a length of the second portion.

In still another aspect of the present invention, a quality indicator channel for mobile communication including at least one switch frame, the switch frame has a first portion including a channel quality information of a serving cell/sector at a beginning portion of the switch frame, a second portion including cell/sector switching information at an end portion of the switch frame, and a third portion including differential information of the channel quality information between the first portion and the second portion, wherein a length of the third portion depends on a length of the second portion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 1A and 1B are diagrams explaining a related art method of transmitting channel information in a normal mode of an active state;

FIGS. 2A and 2B are diagrams explaining a related art method of transmitting channel information in a ½ reduced rate mode of an active state;

FIGS. 3A and 4B are diagrams explaining a related art method of transmitting channel information in a normal mode of a ½-rate control hold mode;

FIGS. 4A and 4B are diagrams explaining a related art method of transmitting channel information in a ½ reduced rate mode of a ½-rate control hold mode;

FIGS. 5A to 5C are diagrams illustrating the construction of frames for transmitting channel information and switching indication information during a cell/sector switching in a DM transmission mode of a normal mode, a reduced rate mode and a reduced rate mode, respectively, according to the present invention;

FIGS. 6A to 6C are diagrams illustrating the construction of frames for transmitting channel information and switching indication information during a cell/sector switching in a full reporting transmission mode of a normal mode, a reduced rate mode and a reduced rate mode, respectively, according to the present invention;

DETAILED DESCRIPTION OF THE INVENTION

Figure 3A:
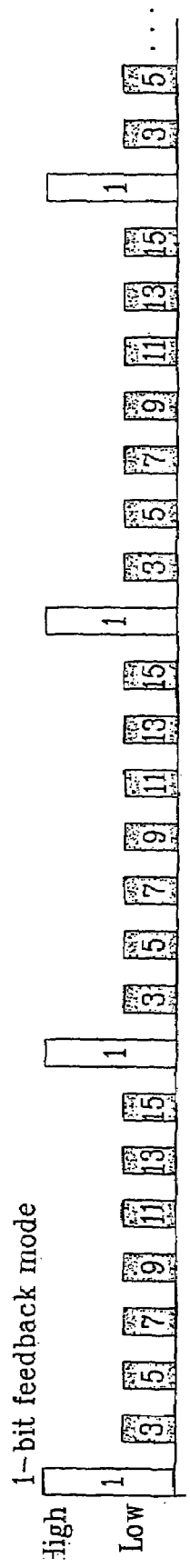
Figure 3B:
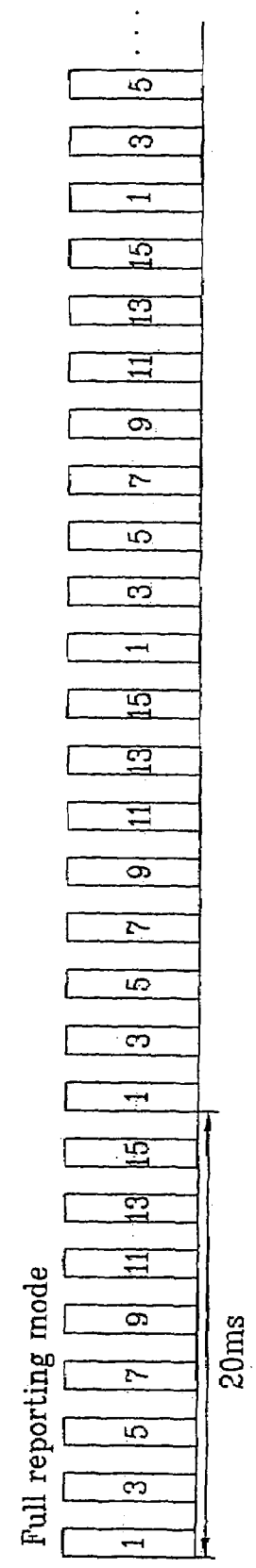

Reference will now be made in detail to the preferred embodiments of the present invention, examples of which are illustrated in the accompanying drawings. Wherever possible, the same reference numbers will be used throughout the drawings to refer to the same or like parts.

First of all, In FIGS. 5 to 12, a height of a rectangle indicates a transmission power of data transmitted on a corresponding slot. If a slot index is the same as the number in a rectangle, the number indicates a new full or new differential C/I measurement that is being reported. If a slot index is different from the number in the rectangle, the C/I measurement is a repetition of a previous C/I measurement that was transmitted on the most recent slot with the index specified by the number in the rectangle. Repetition of the number in the rectangles indicates repetitions of the same C/I measurement (e.g., for the reduced rate mode).

Also, in FIGS. 5 to 12, the label 'Ns' is defined as the number of switching indication slots included in one switch frame. The label 'N' is defined as the number of switch frames repeated during the cell/sector switching procedure. The label 'n' is defined as a repetition factor in a reduced rate mode (or a channel quality indicator (CQI) repetition factor). In case of a ½ reduced rate mode, n becomes 2, and in case of a ¼ reduced rate mode, n becomes 4. It can be assumed that the normal mode corresponds to the case that the CQI repetition factor is 1.

The value of n is one of 1, 2, 3, 4, 6, and 7. The value for 'n' may have different values. If n is 1, it indicates the normal mode, and if n is a value that is not 1, a reduced rate mode such as ½ rate or ¼ rate is defined. It can be defined that one frame of 20 ms is constructed with 16 slots.

The start of the frame is defined for transmitting first full C/I information to a corresponding base station regardless of the transmission mode. In the present invention, it is assumed that switching indication information is transmitted to a base station of a serving cell/sector and target cell/sector when a handoff between cells, between sectors included in different base stations, or a handoff between sectors in one base station is performed (collectively referred to as sector/cell switching procedure).

First, in an active mode that is not a control hold mode, a switch frame according to the present invention is constructed as follows. The active mode indicates the normal mode and the reduced rate mode.

A mobile station repeatedly transmits the switching indication information for indicating the intention of the mobile station itself for the cell/sector switching during (Ns*n) slots at an end portion of a switch frame. The number (Ns*n) of the transmission slots can be counted from the last transmission slot of the switch frame.

For example, when not in the control hold mode, if the number of the slots useful of transmitting the switching indication information is greater than or equal to (Ns*n), the start slot of the switching indication is a [16−(Ns*n)+1]-th slot on the switch frame. The switching indication information transmitted on the [16−(Ns*n)+1]-th slot to the last slot of the switch frame is a specific constant, e.g., "1," or repetition of the same DM information of [16−(Ns*n)+1)-th slot for the serving cell/sector with a Walsh cover corresponding to a target cell/sector.

During the period from first slot to n-th slot (n=1, 2, 3, 4, . . . ), the full C/I information for the serving cell/sector measured at the first slot is repeatedly transmitted by using the Walsh cover of the serving cell/sector. Thereafter, if there are slots left over from (n+1)-th slot to [16−(Ns*n)]-th slot of the switch frame, the C/I information (full C/I information or the DM information for the full C/I information) is transmitted according to a C/I transmitting method defined by a corresponding transmission mode of CQICH. The switch frame is so repeated during N frames that can be accurately detected at the corresponding base station(s) of the serving cell/sector and a target cell/sector.

In a case of N=1, if the mobile station reports the C/I information to the target cell/sector the very after the transmission of the indication information for the cell/sector switching, then, this case can be applied to a case that the target sector and the serving sector are collocated.

Figure 12:
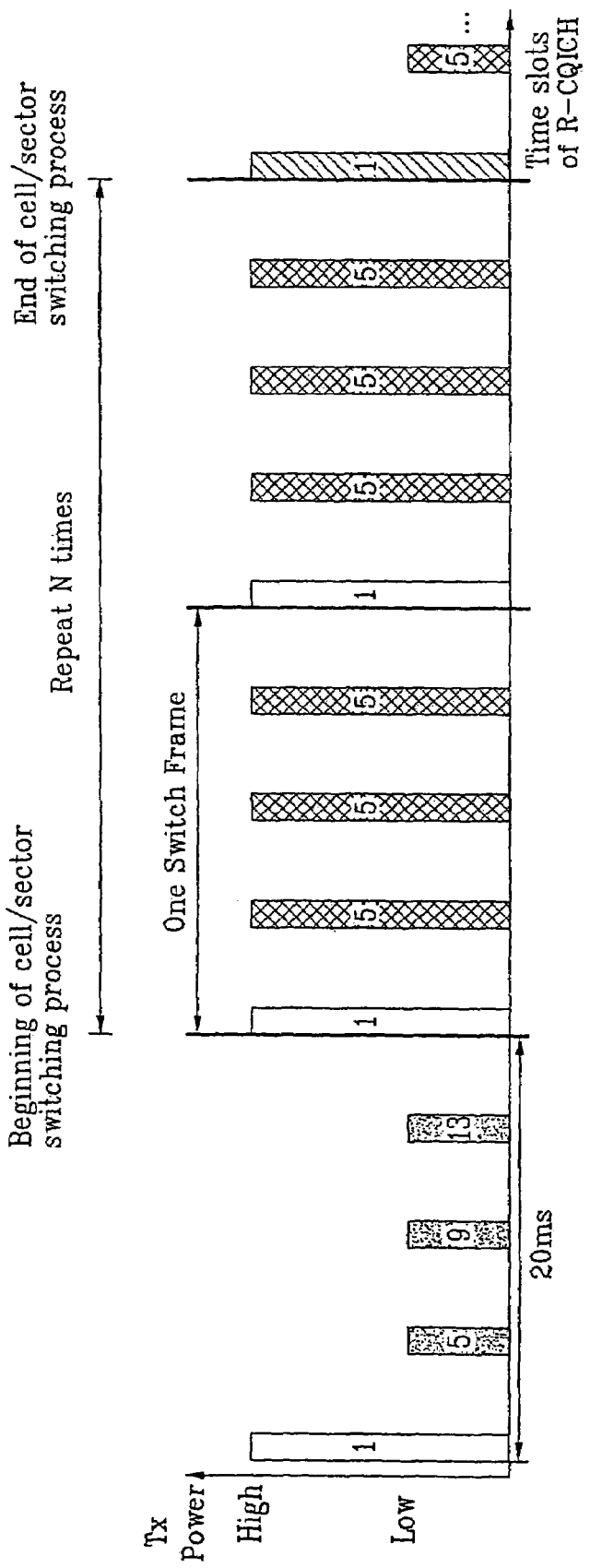
FIG. 12 is a diagram illustrating the construction of frames for transmitting channel information and switching indication information during a cell/sector switching in a DM transmission mode of a normal mode in a ¼-rate control hold mode according to the present invention.

In the present invention, the frame constructions for transmitting the channel information and the switching indication information when the cell/sector switching is arranged through each transmission mode of the CQICH on FIGS. 5 and 12. Here, the switching indication information is pointed as a switch cover (Walsh code) for a target cell/sector to be switched or a specific constant. Moreover, by reverse-counting slots from last slot of a switch frame among useful slots for transmitting the switching indication information within the switch frame, switching indication slots as much as necessary are allocated. That is, slots as much as (Ns*n) slots are allocated for transmitting the switching indication information at an end portion of the switch frame among slots that can be used as the switching indication slots according to respective several transmission modes.

At that time, slots that can be used as the switching indication should exclude slots that must transmit the full C/I information according to the respective transmission modes, and slots being gated-off in the control hold mode. If the number of slots that can be used as the switching indication slots is greater than and equal to (Ns*n), the (Ns*n) slots are allocated as the switching indication slots at an end portion of the switch frame among the slots capable of being used as the switching indication slots, and the rest of the slots except the allocated slots are allocated by the same method with the frame construction method when not the switching indication mode in accordance with the transmission mode.

If the number of slots of capable of being used as the switching indication slots is smaller than (Ns*n), all slots can be used as the switching indication slots is allocated as the switching indication slots. Cell/sector switching indication slot starts from Kth slot of the switch frame where K is a positive integer value determined by subtracting (Ns*n)+1 from a number of slots of the switch frame where a length of the switching indication slots is less than (Ns*n). A length of the differential information of the channel quality information between the carrier-to-interference ratio slot and the cell/sector switching indication slots depends on a length of the cell/sector switching indication slots.

Figure 5C:
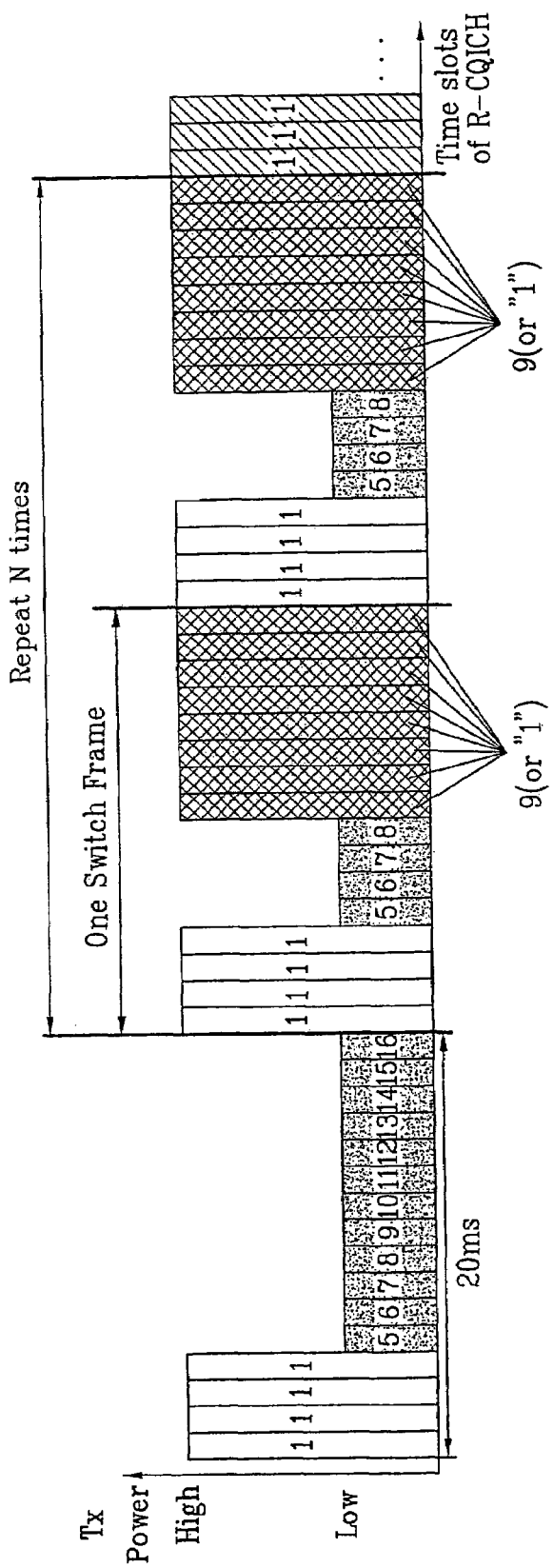

FIGS. 5A through 5C are diagrams illustrating construction of frames for transmitting the channel information and the switching indication information when cell/sector are switched in the DM transmission mode in accordance with the present invention.

By referring FIG. 5A, in the DM transmission mode of the normal operation mode, where Ns=3 and n=1 (reverse CQICH Timing Example with No Pilot Gating and No CQI Repetition and number of switching slots=3), the mobile station transmits full C/I information of a predetermined power level and the number of bits for the serving cell/sector at a first slot of a switch frame at the start of the cell/sector switching procedure. The full C/I information at the first slot is transmitted after being covered with a Walsh code for the serving cell/sector.

During the period from the second slot to 13th slot of the switch frame, differential C/I measurement (hereinafter referred to 'DM') information for the full C/I information of the serving cell/sector is transmitted for every slot. The DM information on from the second slot to the thirteenth slot is transmitted after being covered with a Walsh code for the serving cell/sector.

The switching indication information for target cell/sector that the mobile station wishes to switch is transmitted from a $14^{th}$ slot within the corresponding frame. The value transmitted on the $14^{th}$ slot is any one of a specific constant and DM information of the C/I information for the serving cell/sector measured during the $14^{th}$ slot. The DM information (or constant value) is transmitted after being covered with a Walsh code for the target cell/sector to be switched. The specific constant or the DM information transmitted on the $15^{th}$ and $16^{th}$ slots is a value that has been transmitted on the $14^{th}$ slot is repeated.

Similarly, on the $15^{th}$ and $16^{th}$ slots, the DM information (or constant value) is transmitted after being covered with the Walsh code for the target cell/sector. The Walsh codes for the DM information (or constant value) on the $14^{th}$ to $16^{th}$ slots are indicated as a switch cover.

The transmission power of the $14^{th}$, $15^{th}$ and $16^{th}$ slots does not use a low level transmission power, but a high level transmission power defined for transmitting the full C/I. The mobile station repeatedly transmits the switch frame for N frames of a predetermined switch frame repetition factor so that the base station, including the serving cell/sector and/or the target cell/sector which the mobile station wishes to switch, can accurately detect the switching intention of the mobile station, for example, at which time point and to which the cell/sector switching occurs.

FIG. 5B is a diagram illustrating the constructions of the frames for transmitting the channel information and the switching indication information when the Ns is 7 and n is 2 in the DM transmitting of the reduced rate mode (reverse CQICH Timing Example with No Pilot Gating, and CPQ Repetition Factor of 2 and number of switching slots=7).

As shown in FIG. 5B, based on n=2, the full C/I information for the serving cell/sector at the first and second slots of a switch frame is transmitted when cell/sector switching procedure is initiated. Since, based on Ns=7, the switching indication (a specific constant or the DM information of the full C/I information for the serving cell/sector, covered with the Walsh code for the target cell/sector) can be transmitted during 14(2*7) slots, the number of the 14 slots at an end portion of the switch frame is first determined.

Since the full C/I information must be transmitted on a first and second slots and the switching indicator slots occupy the remaining slots, the DM information of the full C/I information on the first and second slots cannot be transmitted on next slot. In other words, a length of the DM information with a serving cell/sector cover on the switch frame depends on a length of the switching indication information.

As shown in FIG. 5B, a specific constant or the DM information of the full C/I information for the serving cell/sector measured at the third slot after the second slot is repeatedly transmitted with a transmission power which is identical to a transmission power of the full C/I information. As the switch cover, the Walsh code for the target cell/sector is used.

FIG. 5C is a diagram illustrating the construction of the frames for transmitting the channel information and the switching indication information when Ns is 2 and the repetition factor n is 4 in the DM transmission mode of the reduced rate mode (R-CQICH Timing Example with No Pilot Gating, and CQI Repetition Factor of 4 and number of switching slots=2. Based on n=4, the full C/I information for the serving cell/sector during from the first slot to the fourth slot of the switch frame is transmitted. The full C/I information is transmitted after being covered with the Walsh code for the serving cell/sector. Based on Ns=2, for transmitting the switching indication information (a specific constant or DM information relating to the full C/I information for the best serving cell/sector, covered with the Walsh code for the target cell/sector), 8(2*4) slots are required, and 8(eight) slots among the rest slots of the switch frame are first allocated for the switching indication information. That is, a length of the DM information with a serving cell/sector cover on the switch frame depends on a length of the switching indication information.

As shown in FIG. 5C, from the $5^{th}$ slot to $8^{th}$ slot, the DM information measured for full C/I information for every slot is transmitted at the corresponding slot. The DM information on the $5^{th}$ slot to $8^{th}$ slot is transmitted after being covered with the Walsh code for the serving cell/sector.

After this, during from $9^{th}$ slot to the last slot of the switch frame (as predetermined as 8 slots), the specific constant is repeatedly transmitted or the DM information measured for the full C/I information of the serving cell/sector at $9^{th}$ slot is repeatedly transmitted, after being covered with the Walsh code for the target cell/sector. The specific constant or the DM information transmitted after the $9^{th}$ slot has a transmission power which is identical to a transmission power allocated for the full C/I information.

Figure 6A:
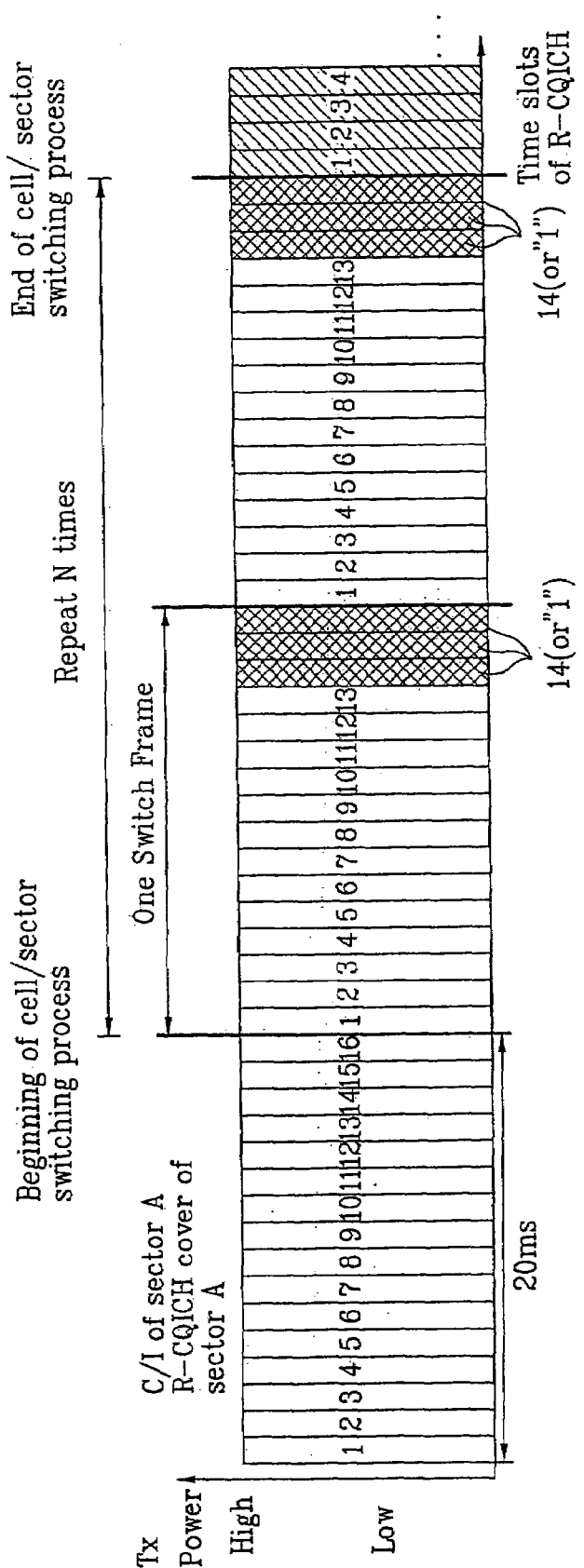
Figure 6B:
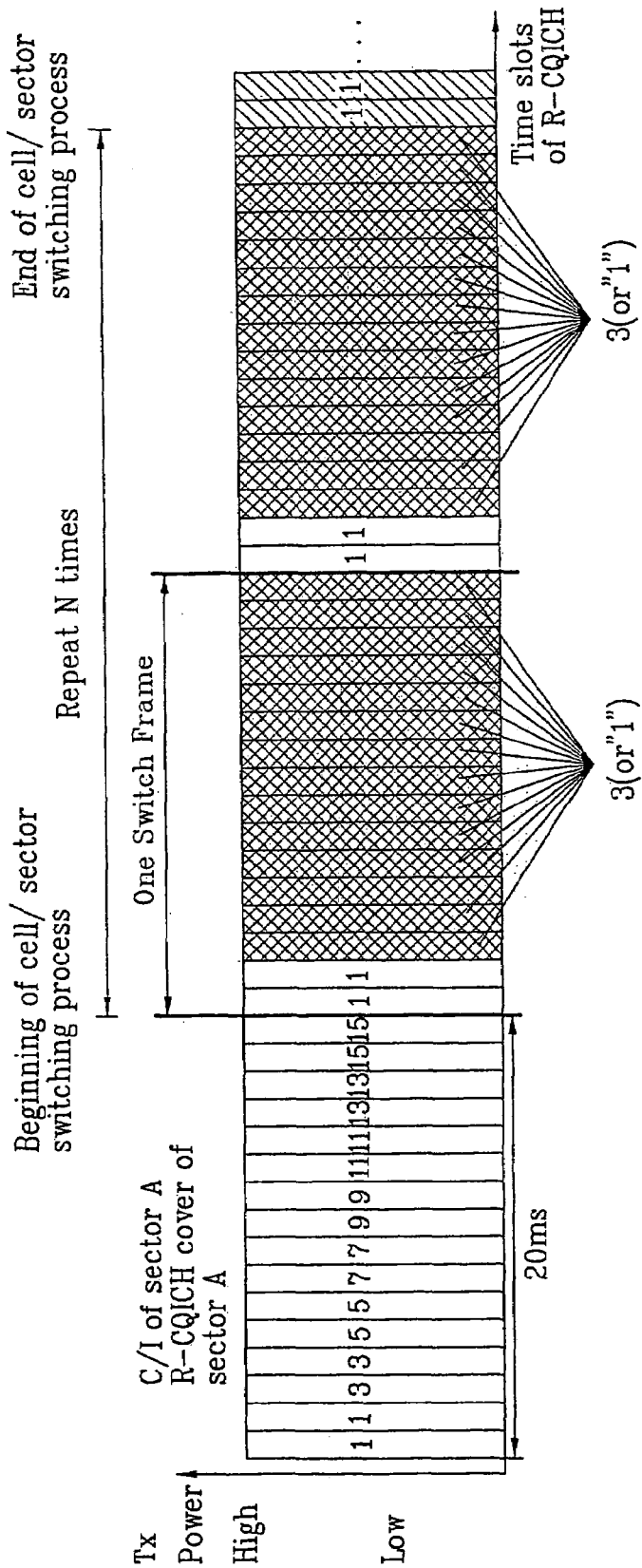

FIGS. 6A to 6C are diagrams illustrating the constructions of the frames for transmitting the channel information and the switching indication information when the cell/sector is switched in the full reporting transmission mode.

FIG. 6A illustrates a normal mode where n=1 and Ns=3 (R-CQICH Timing Example with No Pilot Gating, No CQI Repetition and number of switching slots=3). The mobile station in the full reporting mode of a normal operation mode transmits C/I information with a predetermined power level for the serving cell/sector at the first slot of a switch frame when the cell/sector switching occurs. The full C/I information on the first slot is transmitted after being covered with the Walsh code for the serving cell/sector. From the second slot to the $13^{th}$ slot, the full C/I information for the serving cell/sector is transmitted for every slot after being covered with the Walsh code for the serving cell/sector.

The switching indication information for the target cell/sector that the mobile station would switch is transmitted from the $14^{th}$ slot to the end of the switch frame. The information transmitted on the fourteenth slot is a specific constant or differential C/I measurement (DM) information for the serving cell/sector measured during the fourteenth slot having a predetermined power level. The DM information is transmitted after being covered with the Walsh code for the target cell/sector to be switched.

The value transmitted on the $15^{th}$ slot and $16^{th}$ slot is a value repeating the specific constant or the DM information being transmitted on the $14^{th}$ slot. The DM information on the $15^{th}$ and $16^{th}$ slots is transmitted after being covered with the Walsh code for the target cell/sector.

The transmission power of the 14th, 15th, and 16th slots does not use a low level transmission power defined for DM information of an original full C/I, but a high level transmission power defined for transmitting the full C/I. The mobile station repeatedly transmits the switch frame for N frames of a predetermined switch frame repetition factor so that the base station, including the best serving cell/sector and/or the target cell/sector which the mobile station wishes to switch, accurately detect the switching intention of the mobile station, for example, at which time point and to which the cell/sector switching occurs.

FIG. 6B is a diagram illustrating the construction of the frames for transmitting the channel information and the switching indication information when Ns is 4 and n is 2 in the full reporting transmission mode of the reduced rate mode (R-CQICH Timing Example with No Pilot Gating, and CQI Repetition Factor of 2 and number of switching slots=7). Based on n=2, the full C/I information for the serving cell/sector at the first and second slots of the switch frame is transmitted. Since, based on the Ns 7, 14(2*7) slots are allocated to transmit the switching indication information (a specific constant or DM information relating to the full C/I information for the serving cell/sector, covered with the Walsh code for the target cell/sector). The number of 14 slots including the last slot of the switch frame among the rest slots of the switch frame is first determined and allocated for the switching indication information.

After the first and second slots, the full C/I information for the serving cell/sector measured during every odd (or even) slot cannot be transmitted since the remaining slots have been allocated for the switching indicator information. Thus, the specific constant is repeatedly transmitted, or the DM information of the full C/I information for the serving cell/sector measured during a third slot after the second slot is transmitted repeatedly. The specific constant or the DM information of the switching indicator information has a transmission power which is identical to a transmission power allocated for the full C/I information and transmitted by being covered with the Walsh code (switch cover) for the target cell/sector.

FIG. 6C is a diagram illustrating the construction of the frames for transmitting the channel information and the switching indication information when Ns is 2 and the repetition factor n is 4 in the full reporting transmission mode of the reduced rate mode (R-CQICH Timing Example with No Pilot Gating and CQI Repetition Factor of 4 and number of switching slots=2). Based on n=4, the full C/I information for the serving cell/sector measured for the first slot is repeatedly transmitted from the first slot to the fourth slot of the switch frame. The repeated full C/I information is transmitted after being covered with the Walsh code for the serving cell/sector.

Based on Ns=2, the switching indication information (a specific constant or DM information relating to the full C/I information for the serving cell/sector, covered with the Walsh code for the target cell/sector) requires 8(2*4) slots, and 8 slots among the remaining slots of the switch frame are first allocated for the switching indication information. In other words, a length of the DM information with a serving cell/sector cover on the switch frame depends on a length of the switching indication information.

As shown in FIG. 6C, at the 5th slot to 8th slot, the full C/I information measured during the 5th slot is repeatedly transmitted four times, after being covered with the Walsh code for the serving cell/sector. From the $9^{th}$ slot to the last slot of the switch frame (as predetermined, 8 slots), the specific constant or the DM information measured for the full C/I information of the serving cell/sector on $9^{th}$ slot is transmitted, after being covered with the Walsh code (switch cover) for the target cell/sector. The specific constant or the DM information repeatedly transmitted after the $9^{th}$ slot is identical to a transmission power defined for the full C/I information.

Figure 7:
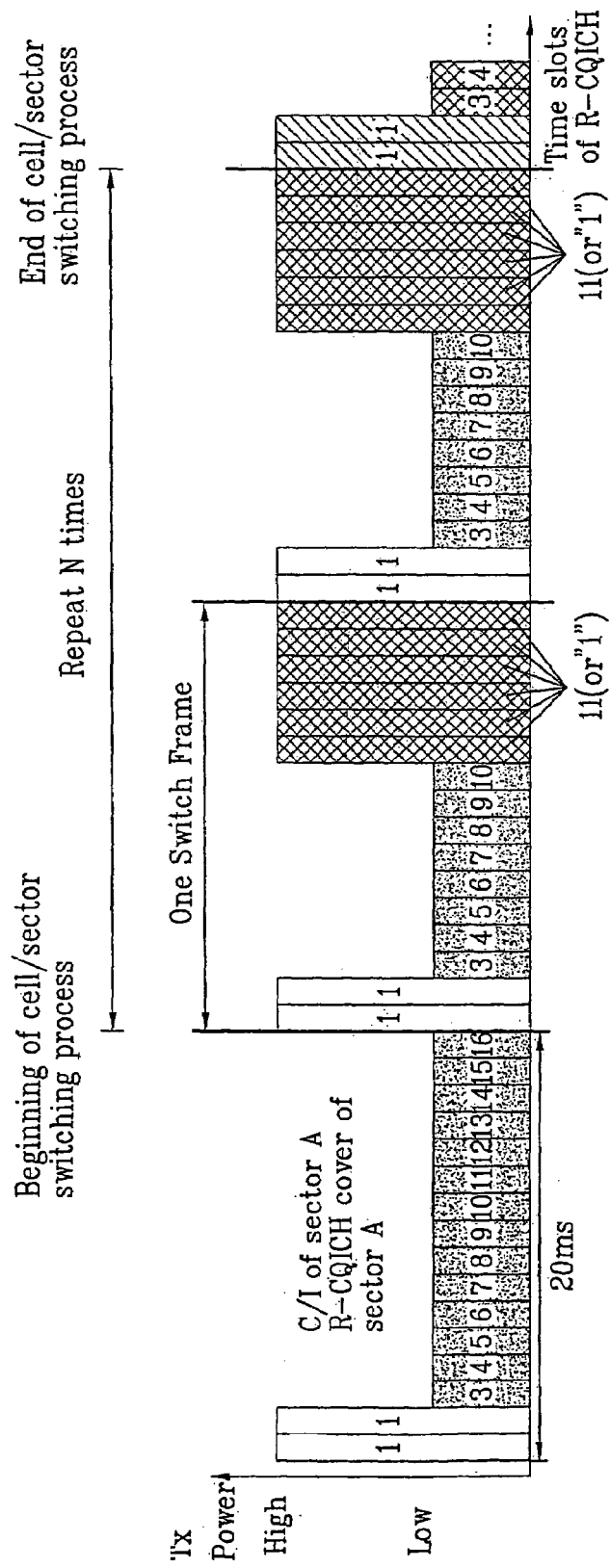
FIG. 7 is a diagram illustrating the construction of frames for transmitting channel information and switching indication information during a cell/sector switching in a DM transmission mode of a ½ reduced rate mode according to the present invention.

FIG. 7 is a diagram illustrating the construction of the frames for transmitting the channel information and the switching indication information when the cell/sector switching occurs in a DM transmission mode of a 1/n reduced rate mode in accordance with the present invention (R-CQICH Timing Example with No Pilot Gating and CQI Repetition Factor of 2 and number of switching slots=3).

Generally, in the DM mode of the 1/n reduced rate mode, the mobile station transmits full C/I information with a predetermined power level and the predetermined number of bits for the serving cell/sector at a first slot of a switch frame when the cell/sector switching occurs. The full C/I information on the first slot is transmitted after being covered with the Walsh code for the serving cell/sector. The full C/I information is repeated by n times in accordance with a channel quality indicating repetition factor 'n'.

With reference to FIG. 7, when n is 2, even at the second slot, the full C/I information on the first slot is repeatedly transmitted. The repeated full C/I information on the second slot is transmitted after being covered with the Walsh code for the serving cell/sector. After this, during the period from (n+1)-th to [16−(3*n)]-th slots, the DM information with the predetermined power level and the number of bits for the full C/I information for the serving cell/sector is measured for every slot and transmitted. The DM information is transmitted after being covered with the Walsh code for the serving cell/sector.

If n is 4, even at the second, the third, and fourth slots, the full C/I information on the first slot is repeatedly transmitted. When n is 4, the full C/I information on the second to fourth slots is transmitted after being covered with the Walsh code for the serving cell/sector. When n is 4, slots for transmitting the DM information of the full C/I information with a serving cell/sector cover does not exist. That is, a length of the DM information with a serving cell/sector cover on the switch frame depends on a length of the switching indication information.

For both n=2 and n=4, the switching indication information for the target cell/sector to be switched by the mobile station starts to transmit from the [16−(3*n)+1]-th slot. The switching indication information transmitted on the [16−(3*n)+1]-th slot has a specific constant or DM information of the full C/I information for the serving cell/sector, wherein the specific constant or the DM information is transmitted after being covered with the Walsh code for the target cell/sector. After the [16−(3*n)+1]-th slot to the last slots of the switch frame, the mobile station repeatedly transmits the specific constant or the DM information transmitted on the slot ([16−(3*n)+1]).

The switching indication information (the specific constant or the DM information of the full C/I information for the target cell/sector covered with the Walsh code for the target cell/sector) transmitted from the [16−(3*n)+1]-th slot to the sixteenth ($16^{th}$) slot does not use a low transmission power defined for the DM information of the full C/I information, but a high transmission power defined for the full C/I information. The mobile station repeatedly transmits the switch frame for an N frame of a predetermined switch frame repetition factor so that the base station, including the best serving cell/sector and/or the target cell/sector which the mobile station wishes to switch, accurately detect the switching intention of the mobile station, for example, at which time point and to which the cell/sector switching occurs.

Figure 8:
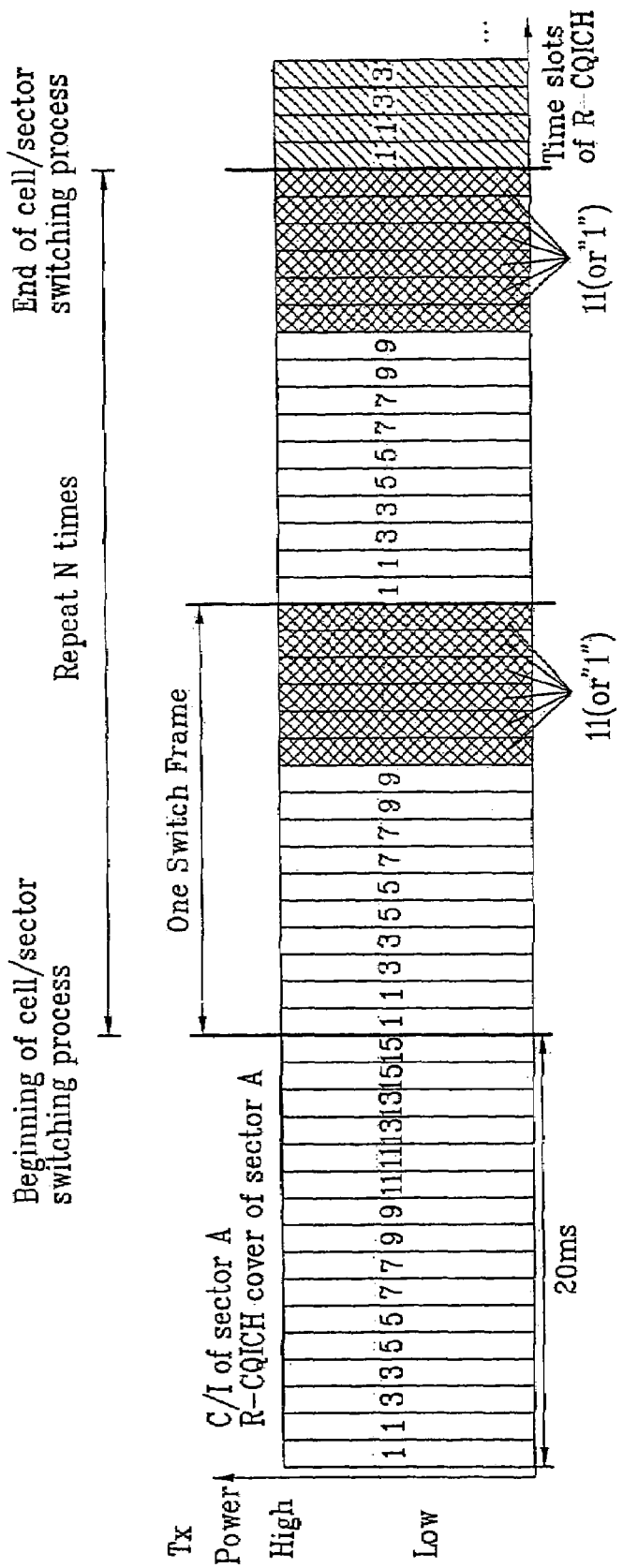
FIG. 8 is a diagram illustrating the construction of frames for transmitting channel information and switching indication information during a cell/sector switching in a full reporting transmission mode of a ½ reduced rate mode according to the present invention.

FIG. 8 is a diagram illustrating the construction of the frames for transmitting the channel information and the switching indication information when the cell/sector switching occurs in a full reporting mode of a 1/n reduced rate mode in accordance with the present invention (R-CQICH Timing Example with No Pilot Gating and CQI Repetition Factor of 2 and number of switching slots=3).

Generally, in the full reporting transmission mode of the 1/n reduced rate mode, the mobile station transmits full C/I information with a predetermined power level for the serving cell/sector at a first slot of a switch frame when the cell/sector switching occurs. The full C/I information on the first slot is transmitted after being covered with the Walsh code for the serving cell/sector. According to the value of 'n', the full C/I information measured for every [n+1]-th slot based on the first slot is repeated n times.

Specifically, as illustrated in FIG. 8, if n is 2 and Ns=3, during the first slot to tenth slot, the mobile station operates identically with the operation in the transmission mode of the CQICH before the cell/sector switching occurs. Specifically, the full C/I information for the serving cell/sector measured during every odd (or even) slots ($1^{st}$, $3^{rd}$, $5^{th}$, $7^{th}$, and $9^{th}$ slots) is transmitted by being repeated by two times. During this period, the full C/I information is transmitted after being covered with the Walsh code for the serving cell/sector.

If the mobile station wants to switch, the switching indication information (a specific constant or DM information of the full C/I information for the serving cell/sector, covered with the Walsh code for the target cell/sector) starts to be transmitted. At the [16−(3*n)+1]-th slot, the mobile station transmits the specific constant or the DM information of the full C/I information for the serving cell/sector having the predetermined power level and the number of bits. The specific constant or DM information on the [16−(3*n)+1]-th slot is transmitted after being covered with the Walsh code for the target cell/sector. During the period from the next slot after the [16−(3*n)+1]-th slot to the last slot of the switch frame, the mobile station repeatedly transmits the specific constant or DM information transmitted on the [16−(3*n)+1]-th slot.

The specific constant or DM information transmitted repeatedly during the period from the [16−(3*n)+1]-th slot to $16^{th}$ slot does not use a low transmission power defined for the DM information of the full C/I information, but a high transmission power defined for the full C/I information. The mobile station repeatedly transmits the switch frame for N frames, which is a predetermined switch frame repetition factor, so that the base station, including the best serving cell/sector and/or the target cell/sector which the mobile station wishes to switch, can accurately detect the switching intention of the mobile station, for example, at which time point and to which the cell/sector switching occurs.

Figure 9:
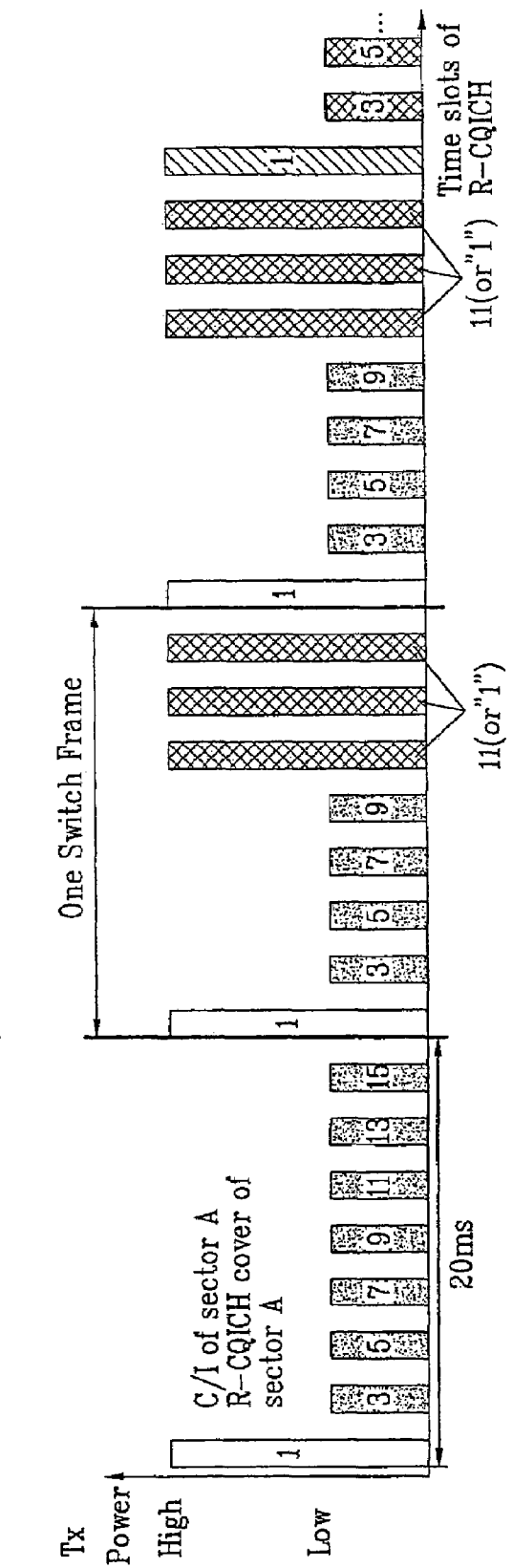
FIG. 9 is a diagram illustrating the construction of frames for transmitting channel information and switching indication information during a cell/sector switching in a DM transmission mode of a ½-rate control hold mode according to the present invention.

FIG. 9 is a diagram illustrating the construction of the frames for transmitting the channel information and the switching indication information when the cell/sector switching occurs in DM information transmission mode of the ½-rate control hold mode in accordance with the present invention. R-CQICH Timing Example with Pilot Gating Rate ½ and CQI Repetition and number of switching slots=3.

In general, a frame transmitted in the control hold mode has a pilot gating as a duty cycle of 50% or 25% (percentage), and according to the pilot gating pattern, a channel information (C/I information with a predetermined power level and the predetermined number of bits (hereinafter referred to 'full C/I information') or a differential C/I measurement (hereinafter referred to 'DM') information is transmitted. When a corresponding frame has a 50% pilot gating (½-rate control hold mode), at slots corresponding 50% of the frame, the full C/I information or the DM information the full C/I information is transmitted.

FIG. 9, in the DM transmission mode of the ½ reduced rate transmission mode, illustrates the full C/I information and the DM information of the full C/I information. Since the cell/sector switching is not defined in the reduced rate mode and the control hold mode, the mode is previously converted into the active mode when the mobile station wants the cell/sector switching. At switch frames defined in the DM mode of the ½ reduced rate transmission mode, the full C/I information and a specific constant or the DM information of the full C/I information are transmitted.

As shown in FIG. 9, in the DM transmission mode of the ½-rate control hold mode, the mobile station transmits the full C/I information for the serving cell/sector having the predetermined power level and the predetermined number of bits at the first slot of a switch frame. The full C/I information on the first slot is transmitted after being covered with the Walsh code for the serving cell/sector. Since Ns is 3 (three), a period of three slots for transmitting switching indication information (a specific constant or DM information of the full C/I information for the serving cell/sector is covered with the target cell/sector) is previously allocated.

The full C/I information for the serving cell/sector measured during every odd (or even) slot from the slot next to the first to a slot prior to the eleventh slot is transmitted on a corresponding slot. The DM information transmitted for every odd (or even) slot from the slot next to the first to a slot prior to the eleventh slot is transmitted after being covered with the Walsh code for the serving cell/sector. After this, the specific constant or DM information measured at the eleventh slot during three slots after the eleventh slot in corresponding to the ½ pilot gating rate is transmitted after being covered with the Walsh code for the target cell/sector.

Figure 10:
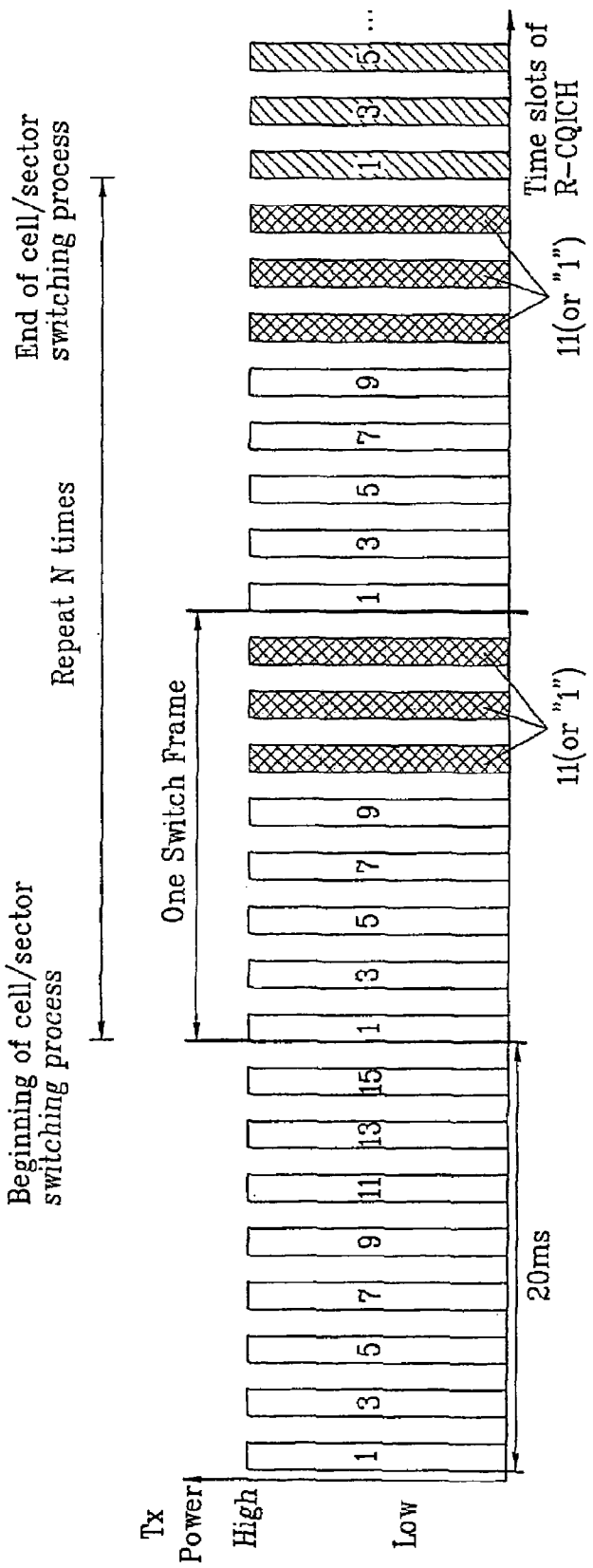
FIG. 10 is a diagram illustrating the construction of frames for transmitting channel information and switching indication information during a cell/sector switching in a full reporting transmission mode of a ½-rate control hold mode according to the present invention.

FIG. 10 is a diagram illustrating the construction of the frames for transmitting the channel information and the switching indication information when the cell/sector switching occurs in a full reporting transmission mode of the ½-rate control hold mode in accordance with the present invention. R-CQICH Timing Example with Pilot Gating Rate ½ and No CQI Repetition and number of switching slots=3.

By referring FIG. 10, in the full reporting transmission mode of the ½-rate control hold mode, the full C/I information measured during the corresponding slot for every odd (or even) slot from the first slot to a ninth slot of the switch frame is transmitted after being covered with the Walsh code for the serving cell/sector. Since FIG. 10 shows the case that Ns is 3 (three) like as the case shown in FIG. 9, based on this Ns, the period of the three slots for transmitting the switching indication information (a specific constant or information that the DM information for the full C/I information of the serving cell/sector, covered with the Walsh code for the target cell/sector) is previously allocated. That is, a length of the DM information with a serving cell/sector cover on the switch frame depends on a length of the switching indication information.

Therefore, the full C/I information measured for every odd (or even) slot from the slot next to the first slot to a slot prior to the eleventh slot is transmitted. The full C/I information transmitted for every odd (or even) slot from the slot next to the first to the slot prior to the eleventh slot is transmitted after being covered with the Walsh code for the serving cell/sector.

After this, the specific constant is transmitted repeatedly, or the DM information measured at the eleventh slot during three slots after the eleventh slot in corresponding to the ½ pilot gating rate is repeatedly transmitted after being covered with the Walsh code (switch cover) for the target cell/sector, and has a transmission power which is identical to a transmission power defined for the full C/I information.

Figure 11:
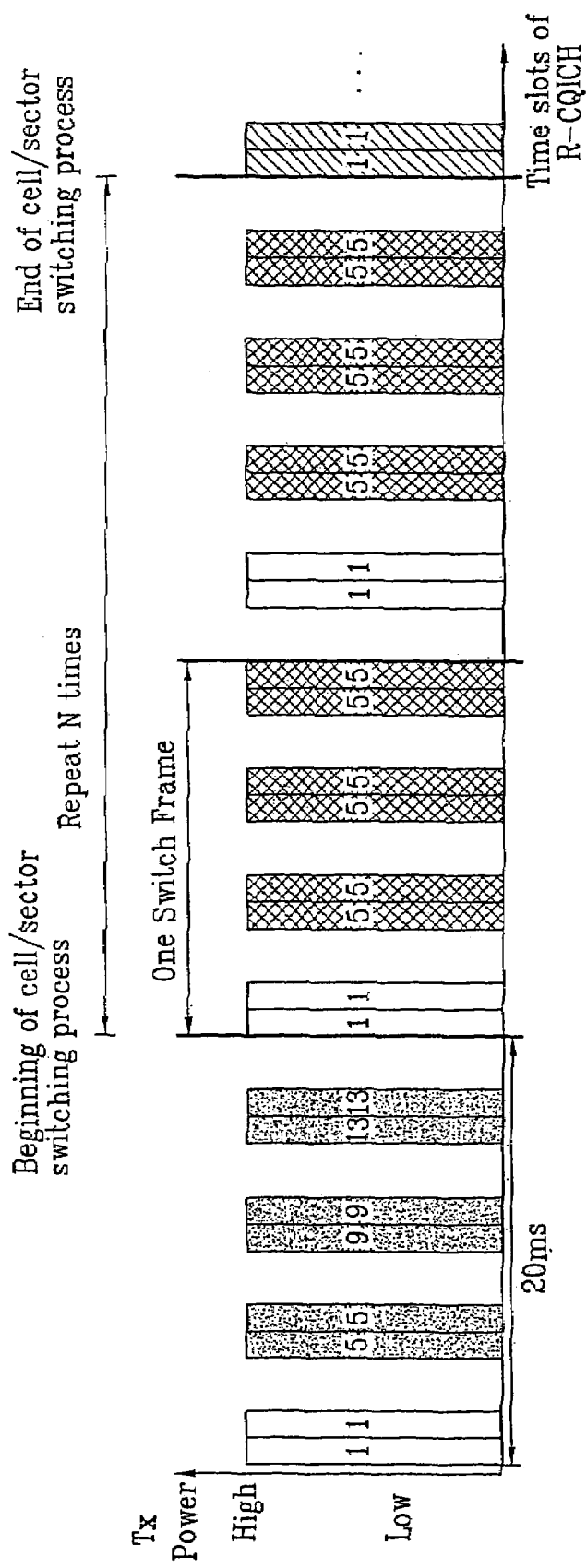
FIG. 11 is a diagram illustrating the construction of frames for transmitting channel information and switching indication information during a cell/sector switching in a full reporting mode of a ½ reduced rate mode in a ½-rate control hold mode according to the present invention.

FIG. 11 is a diagram illustrating the construction of the frames for transmitting the channel information and the switching indication information when the cell/sector switching occurs in a full reporting transmission mode of a ½ reduced rate mode in the ½ rate control hold mode in accordance with the present invention. Here, Ns is 3 and n is assumed to be 2. R-CQICH Timing Example with Pilot Gating Rate ½ and CQI Repetition Factor of 2 and number of switching slots=3.

In FIG. 11, it is assumed that the channel information and the switching indication information are transmitted in corresponding to the ½ pilot gating rate every odd (or even) slot. In the full reporting transmission mode of the ½-rate control hold mode, the full C/I information measured during the first slot is transmitted at the first slot and the second slot of a switch frame after being covered with the Walsh code for the serving cell/sector.

Since Ns is 3, the period of the six slots of the switch frame for transmitting the switching indication information (a specific constant or DM information of the full C/I information for the serving cell/sector, covered with the Walsh code for the target cell/sector) is previously allocated. That is, a length of the DM information with a serving cell/sector cover on the switch frame depends on a length of the switching indication information.

To secure the period of the six slots in the ½ pilot gating rate, there is no existence of a slot where the full C/I information or the DM information for the serving cell/sector measured during the corresponding slot after the first and second slots can be transmitted. Therefore, the specific constant or the DM information measured at fifth slot every odd (or even) slot from the fifth slot to the last slot of the switch frame is repeatedly transmitted. The repeated specific constant or DM information is transmitted after being covered with the Walsh code for target cell/sector that the mobile station wishes to switch, and has a transmission power which is identical to a transmission power defined for the full C/I information.

FIG. 12 is a diagram illustrating the construction of the frames for transmitting the channel information and the switching indication information when the cell/sector switching occurs in the DM transmission mode of the normal mode in the ¼-rate control hold mode in accordance with the present invention. Here, Ns is greater than or equal to 3 and is assumed to be a value less than 7 (seven) is a maximum value defined by the system. Moreover, n is assumed to be 1. R-CQICH Timing Example with Pilot Gating Rate ¼ and No CQI Repetition and number of switching slots=4, 5, 6 or 7.

In FIG. 12, it is assumed that the channel information and the switching indication information are transmitted in corresponding to the ¼ pilot gating rate every ¼ slot. In the DM transmission mode of the ¼-rate control hold mode, the full C/I information measured during the first slot is transmitted at the first slot of the switch frame after being covered with the Walsh code for the serving cell/sector.

Since Ns is greater than or equal to 3, the slots more than three among the rest slots of the switch frame for transmitting the switching indication information (a specific constant or DM information of the full C/I information for the serving cell/sector, covered with the Walsh code for the target cell/sector) is previously allocated. That is, a length of the DM information with a serving cell/sector cover on the switch frame depends on a length of the switching indication information. Since one switch frame has 16 slots, only at 3 slots, it can be transmitted the switching indication information for a case that the ¼-rate pilot gating rate and Ns is greater than or equal to 3.

Therefore, after the first slot, the specific constant or the DM information measured at the fifth slot is repeatedly transmitted on the rest slots of the switch frame. The repeated constant or DM information is transmitted after being covered with the Walsh code for target cell/sector that the mobile station wishes to switch, and has a transmission power which is identical to a transmission power defined for the full C/I information.

As described above, according to the present invention, the corresponding base station(s) of the serving cell/sector and the target cell/sector can properly receive the CQICH at the cell/sector switch. That is, the corresponding base station(s) of the serving cell/sector and the target cell/sector Walsh-decovers the received DM information during (Ns*n) slots at an end portion of every switch frame by using pre-allocated Walsh code. Based on the DM information obtained from the result from the Walsh decovering, the previous full C/I information is updated. After finally receiving the DM information at the last slot of the corresponding frame, the values of the DM information received at the previous (Ns*n)-1 slots are soft-combined with the value of the last DM information. Based on the result from the soft-combining, the base station(s) detects the switching intention of the mobile station finally. As a result of the detection, since the serving cell/sector is capable of re-synchronizing for the C/I information using the full C/I information received at the first slot of the very next frame, the previous wrong C/I information should not be corrected. Moreover, since successive full C/I information or DM information is continuously received until a receiving slot of the switching indication information from after the reception of the full C/I information in the view of the serving cell/sector, the time delay at the C/I update necessary in the conventional manner can be removed. Therefore, the C/I can be so more accurately updated that more accurate scheduling during the switch frame is possible.

The method used by the mobile station for transmitting the switching indication information at the cell/sector switching is summarized as follow.

If the mobile station wishes to switch to new cell/sector, the specific constant or DM information for the C/I information of the best serving cell/sector is repeatedly transmitted during the last (Ns*n) slots of the 20 ms. Moreover, the Walsh cover used in the period of the last (Ns*n) slots is the Walsh cover corresponding to the target cell/sector. The transmission power for the specific constant or DM information is a high transmission power defined for the full C/I information.

However, in general, assuming the state that the mobile station wishes to switch, there is scarcely few cases that can be determined the case that the corresponding base station(s) of the serving cell/sector schedules the packet data channel for the corresponding mobile station during the transmission of the switching indication information. If during the transmission of the switching indication information, the mobile station transmits the predetermined constant (for example, 1) repeatedly. The possibility of the false alarm that the corresponding base station(s) of the serving cell/sector or the target cell/sector can determine that there is an occurrence of a switching though the mobile station does not intend to switch, can be reduced. Therefore, another method for the switching indication according to the present invention is summarized as follow.

If the mobile station wishes to switch to new cell/sector, the predetermined constant (for example, 1) is repeatedly transmitted during the (Ns*n) slots at an end portion of every switch frame. Moreover, the Walsh cover used in this period is the Walsh cover corresponding to the target cell/sector. The transmission power used at this time is a high transmission power defined for the full C/I information.

According to the method of transmitting the power ratio of a carrier-to-information on the reverse channel, more especially, the C/I reporting method used at the CQICH when the cell/sector switching at the 1xEV-DV (1 extreme Evolution—Data & Voice) system, after transmission of the full C/I information of the best serving cell/sector, the DM information or the predetermined constant is transmitted n*Ns times. The repeated specific constant or DM information has a same transmission power with the transmission power of the full C/I information. While the full C/I information is covered with the switch cover for the best serving cell/sector, the specific constant or DM information is covered with the switch cover for the target cell/sector. Therefore, since the cell/sector switching can be performed based on the specific constant or DM information when, due to temporary change for the worse of the channel environment, the base station cannot detect yet the switch cover of the cell/sector full C/I, the reliability of detecting the occurrence of the cell/sector switching is so increased that the reliability for the communication can also be increased.

Moreover, the interruption of the C/I update process, can be occurred while the switching indication information is transmitted in updating the C/I, can be reduced to minimum. There is another advantage that a switching sequence is constructed so that more rapid cell/sector switching can be performed when the best serving sector and the target sector to be switched are collocated by adjusting the switch frame repetition factor N.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for transmitting a frame for sector to sector switching, comprising:
   transmitting channel quality information using at least one first slot at a beginning portion of the frame;
   transmitting cell/sector switching information using at least one second slot near an end portion of the frame; and
   transmitting differential information of the channel quality information with a serving cell/sector cover using at least one third slot between the at least one first slot and the at least one second slot,
   wherein a length of the at least one third slot is determined depending on a length of the at least one second slot.

2. The method of claim 1, wherein the length of the at least one second slot is determined by multiplying Ns by n where Ns is a number of switching indication slots included in the frame and n is a slot repetition factor of the channel quality information.

3. The method of claim 1, wherein the channel quality indicating information includes a carrier-to-interference (C/I) ratio.

4. The method of claim 1, wherein a length of the frame is 20 ms.

5. The method of claim 4, wherein a length of each slot is 1.25 ms.

6. The method of claim 1, wherein the cell/sector switching information is one of a specific constant and differential information of the channel quality information with a target cell/sector cover.

7. The method of claim 1, wherein a transmission power of the at least one second slot is identical to that of the at least one first slot.

8. The method of claim 1, wherein the at least one second slot starts from Kth slot of the frame where K is a positive integer value determined by subtracting (Ns*n)+1 from a number of slots of the frame, wherein Ns is a number of switching indication slots included in the frame and n is a slot repetition factor of channel quality indicating information.

9. A method of transmitting a switch frame in a cell/sector at a mobile station, comprising:
  transmitting channel quality information using at least one slot at a beginning portion of the switch frame;
  transmitting cell/sector switching information using at least one slot at an end portion of the switch frame; and
  transmitting differential information of the channel quality information with a serving cell/sector cover,
  wherein a length of the differential information is determined depending on a length of the cell/sector switching information.

10. The method of claim 9, wherein the cell/sector switching information is one of a constant and differential information of the channel quality information with a target cell/sector cover.

11. A method for transmitting a switch frame, comprising:
  transmitting channel quality information of a serving cell/sector using a first portion at a beginning portion of the switch frame;
  transmitting cell/sector switching information using a second portion at an end portion of the switch frame; and
  transmitting differential information of the channel quality information using a third portion between the first portion and the second portion,
  wherein a length of the third portion depends on a length of the second portion if the first and second portions do not occupy the entire switch frame.

12. The method of claim 11, wherein the length of the second portion is determined by multiplying Ns by n where Ns is a slot repetition of the switching information and n is a repetition factor of the channel quality information.

13. The method of claim 12, wherein the cell/sector switching information is obtained by repeating Ns*n times differential information of the channel quality information with a target cell/sector cover on slots of the second portion, wherein the differential information with the target cell/sector cover being estimated in a first slot of the second portion.

14. The method of claim 12, wherein the cell/sector switching information is obtained by repeating Ns*n times differential information of the channel quality information with a target cell/sector cover on a first gated-on slot of the second portion, wherein the differential information with the target cell/sector cover being estimated on a gated-on slot of the second portion.

15. The method of claim 12, wherein the cell/sector switching information is obtained by repeating Ns*n times a specific constant to a target cell/sector on slots of the second portion.

16. The method of claim 12, wherein a transmission power of the second portion is identical to a transmission power of the channel quality information of the first portion.

17. A method for transmitting a switch frame, comprising:
  transmitting channel quality information of a serving cell/sector using a first portion at a beginning portion of the switch frame;
  transmitting cell/sector switching information using a second portion at an end portion of the switch frame; and
  transmitting differential information of the channel quality information using a third portion between the first portion and the second portion,
  wherein a length of the third portion depends on a length of the second portion if the first and second portions do not occupy the entire switch frame.

18. The method of claim 17, wherein the length of the second portion is determined by multiplying Ns by n, where Ns is a number of switching indication slots included in the frame and n is a repetition factor of the channel quality information.

19. A method for transmitting a frame on a channel quality indicator channel (CQICH) comprising:
  prescribing a number (i) of slots in the frame, wherein
  (n) number of the prescribed number (i) of slots of the frame has a full report for a current sector, where n≧1; and
  (m) number of the prescribed number (i) of the slots has a switch indication information for a target sector, where (m)≧1, and each of the (m) number of slots has a constant value as the switch indication information, the frame allowing a mobile station to switch from a current sector to a target sector.

20. The method of claim 19, wherein the constant value equals "1" for each slot of (m) number of slots.

21. The method of claim 19, wherein a distinctive pattern of the frame is based on a normal mode or reduced rate mode of the mobile station, where n>1 in a reduced rate mode.

22. The method of claim 21, wherein for each of the normal mode and reduced rate mode, there are two modes of operations, which are full C/I feedback mode and differential C/I feedback mode.

23. The method of claim 22, wherein the distinctive pattern is modified by a pilot gating rate.

24. The method of clam 19, wherein the full report comprises 4-bits for each slot, and the switch indication information comprises 1-bit for each slot.

25. The method of claim 19, wherein (n) number of slots are allocated at a beginning of the frame and (m) number of slots are allocated at an end of the frame.

26. The method of claim 19, wherein the (n) number of slots are provided with a Walsh cover of the current sector and (m) number of slots are provided with a Walsh cover of the target sector.

27. The method of claim 19, wherein (n) number of slots and (m) number of slots are transmitted at substantially the same power level.

28. The method of 19, wherein (m) number of the prescribed number (i) of slots being dependent upon at least one of (1) whether (n*Ns)>(i−n) or (n*Ns)≦(i−n), where Ns is a prescribed value.

29. The method of claim 28, wherein if (n*Ns)>(i−n), then (m)=(i−n) unless modified based on a pilot gating rate of less than one.

30. The method of claim 29, wherein if (n*Ns)≦(i−n), then (m)=(n*Ns) and any remaining number (i−+(n*Ns)) of slots includes one of full C/I measurement and differential C/I measurement based on a mode of operation unless modified based on the pilot gating rate of less than one.

31. The method of claim 30, wherein if the remaining slots are differential C/I measurements, both (m) and (n) number of slots are transmitted at a high power and the remaining number (i−(n+(n*Ns)) of slots are transmitted at a low power.

32. The method of claim 31, wherein Ns is a number of switching slots, where (i)=16 and Ns≧1.

33. The method of claim 31, wherein (n) number of slots and the remaining number (i−(n+(n*Ns)) of slots are transmitted by the mobile station using a Walsh cover of the current sector and (m) number of slots are transmitted by the mobile station using a Walsh cover of the target sector.

34. The method of claim 19, wherein the frame provides signal quality information during a switching period.

35. The method of claim 19, wherein the frame is repeated based on a predetermined switch repetition factor.

36. A method for communicating channel quality from a mobile station to a base station in a wireless communication system, the method comprising:
  transmitting channel quality indicator data, associated with a first base station, in at least one starting slot of a plurality of slots in a frame, the channel quality indicator data being transmitted on a reverse channel quality indicator channel; and
  transmitting switching information to the first base station, the switching information comprising a predetermined value associated with controlling transmission power and a switch cover information associated with a second base station, the switching information being transmitted in at least one ending slot in the frame, wherein the at least one starting slot and the at least one ending slot are spatially displaced with at least one intermediate slot in the frame, the at least one intermediate slot comprising information associated with the channel quality indicator data associated with the first base station,
  wherein the at least one starting slot and the at least one ending slot are transmitted in full power, and wherein a length of the at least one intermediate slot is determined depending on a length of the at least one ending slot.

37. The method of claim 36, wherein the transmission power of the at least one starting slot and the at least one ending slot is the same.

38. The method of claim 36, wherein the channel quality indicating data comprises a carrier-to-interference ratio.

39. The method of claim 36, wherein the at least one intermediate slot comprises differential information of the channel quality indicator data.

40. The method of claim 36, wherein the switching information further comprises differential information of the channel quality indicator data.

41. The method of claim 36, further comprising:
  repeatedly transmitting the frame for a predetermined time during a cell/sector switching period.

42. The method of claim 36, wherein the predetermined value is associated with increasing transmission power.

43. A method for communicating channel quality from a mobile station to a base station in a wireless communication system, the method comprising:
  receiving from a mobile station channel quality indicator data, associated with a first base station, in at least one starting slot of a plurality of slots in a frame, the channel quality indicator data being received on a reverse channel quality indicator channel; and
  receiving switching information from the mobile station, the switching information comprising a predetermined value associated with controlling transmission power and a switch cover information associated with a second base station, the switching information being received in at least one ending slot in the frame, wherein the at least one starting slot and the at least one ending slot are spatially displaced with at least one intermediate slot in the frame, the at least one intermediate slot comprising information associated with the channel quality indicator data associated with the first base station,
  wherein the at least one starting slot and the at least one ending slot are communicated in full power, and wherein a length of the at least one intermediate slot is determined depending on a length of the at least one ending slot.

44. The method of claim 43, wherein the transmission power of the at least one starting slot and the at least one ending slot is the same.

45. The method of claim 43, wherein the channel quality indicating data comprises a carrier-to-interference ratio.

46. The method of claim 43, wherein the at least one intermediate slot comprises differential information of the channel quality indicator data.

47. The method of claim 43, wherein the switching information further comprises differential information of the channel quality indicator data.

48. The method of claim 43, further comprising:
  repeatedly receiving the frame for a predetermined time during a cell/sector switching period.

49. The method of claim 43, wherein the predetermined value is associated with increasing transmission power.

50. A method of transmitting a switch frame in a cell/sector at a mobile station, comprising:
  transmitting channel quality information using at least one first slot at a beginning portion of the switch frame;
  transmitting cell/selector switching information using at least one second slot at an end portion of the switch frame; and
  transmitting differential information of the channel quality information using at least one third slot between the at least one first slot and the at least one second slot,
  wherein a length of the at least one third slot is determined depending on a length of at least one second slot.

51. The method of claim 50, wherein the cell/sector switching information is one of a constant and differential information of the channel quality information with a target cell/selector cover.

* * * * *